United States Patent [19]

Sorensen

[11] Patent Number: 5,043,067

[45] Date of Patent: Aug. 27, 1991

[54] CROSS-FLOW PERMEATOR

[75] Inventor: James C. Sorensen, Allentown, Pa.

[73] Assignee: Air Products and Chemicals, Inc., Allentown, Pa.

[21] Appl. No.: 631,590

[22] Filed: Dec. 21, 1990

[51] Int. Cl.$^5$ .............................................. B01D 63/04
[52] U.S. Cl. ............................ 210/321.8; 210/321.89; 210/500.23
[58] Field of Search ........... 210/321.1, 321.72, 321.78, 210/321.79, 321.87, 321.8, 321.88, 321.89, 500.23

[56] References Cited

U.S. PATENT DOCUMENTS

| | | | |
|---|---|---|---|
| 4,080,296 | 3/1978 | Clark | 210/323 |
| 4,083,780 | 4/1978 | Call | 210/23 |
| 4,119,417 | 10/1978 | Heki et al. | 55/158 |
| 4,652,373 | 3/1987 | Trimmer | 210/321.1 |
| 4,666,469 | 5/1987 | Krueger et al. | 55/16 |

*Primary Examiner*—Frank Sever
*Attorney, Agent, or Firm*—Mark L. Rodgers; William F. Marsh; James C. Simmons

[57] ABSTRACT

An improved cross-flow membrane module having a cylindrical housing containing semi-permeable membranes for separating a feed fluid is provided wherein a seal device is positioned in the permeate compartment of the module to separate the permeate stream passing through the semi-permeable membranes into two or more streams having differing component concentrations.

6 Claims, 2 Drawing Sheets

CROSS-FLOW PERMEATOR

TECHNICAL FIELD OF THE INVENTION

The present invention relates to cross-flow permeator designs for the separation of a feed stream into two or more streams having different concentrations.

BACKGROUND OF THE INVENTION

Conventional cross-flow membrane modules used to separate gas or liquid mixtures in separations where the product is the retentate do not provide a means of separately capturing the fluid permeating through the membrane in the downstream, or product section of the module. Past a certain point in the module, which varies from application to application, this fluid has a higher concentration of the desired product than the incoming feed.

Various permeator module designs for fluid separation are described in the patent literature. U.S. Pat. No. 4,080,296 discloses a hollow fiber permeator comprising an elongated, ordered bundle of selectively permeable hollow fibers passing through a central tubesheet formed around a perforated feed tube containing a coaxial permeate conduit. U.S. Pat. No. 4,652,373 discloses a hollow fiber reverse osmosis permeator separation unit comprising hollow fibers spirally wound on a hollow core creating a bundle of fiber lengths. Each of the fiber lengths pass through a tubesheet which is drilled with a hole pattern that cuts through all of the hollow fibers.

U.S. Pat. No. 4,666,469 discloses a hollow fiber membrane device comprising a plurality of hollow fiber membranes assemblies in a bundle about a feed flow distribution means with said membranes embedded in at least one tubesheet and the lumens of the fibers communicating through the tubesheet. A wrap of material envelopes a major portion of the longitudinal dimensions of the plurality of inner fibers assembled about the feed flow distribution means. The wrap serves to constrain the movement of the fibers within the wrap, but is formainous or contains other openings which permit passage of feed fluid through the inner fibers to the hollow fiber membranes. The permeate is collected in a header space of the device and removed at essentially the same concentration via two exit ports.

U.S. Pat. No. 4,119,417 discloses a gas separator comprising two membrane separation cells arranged in series. The first membrane separation cell comprises a feed pipe for conducting a gas mixture to a high pressure chamber of the first cell and a leadout pipe for drawing off either permeate or reject gas from the membrane located within the cell to a second separation cell. Either the permeate gas or reject gas from the second membrane cell is carried via a feedback pipe to the feed to the first separation cell.

U.S. Pat. No. 4,083,780 discloses a fluid purification system comprising a plurality of spiral wrap membrane elements placed in parallel within a pressure vessel. The spiral wrap membrane elements are designed to have product fluid passageways of short length to insure a low pressure drop in the passageways. The impurified fluid, i.e., that not collected as the main products, exits the vessel through a single fluid outlet.

BRIEF SUMMARY OF THE INVENTION

The present invention is an improved cross-flow membrane separation module for the separation of a feed fluid. Typical separation modules comprise a housing means having a fluid inlet positioned such that incoming feed fluid contacts semi-permeable membranes contained in the housing means such that the feed flow is separated into a non-permeate product stream and a permeate stream. The housing means may be simply a mechanical structure to hold the membranes in place, or optionally may be a pressurized shell. Such housing means is typically an elongated, cylindrical structure. The module may be designed in accordance with a wide variety of configurations, examples of which include a design wherein the incoming feed directly contacts a series of membrane elements, such as a series of hollow fiber disks, a design wherein the incoming feed passes through the feed passages in a flat sheet spiral wound element to directly contact the membranes, or a design in which the feed flows through a feed pipe running axially through the housing means wherein the feed pipe has openings at various points along its length to allow feed to contact membranes positioned within the housing means. A product outlet, in fluid communication with the housing means, is positioned to remove the non-permeate product stream. A permeate compartment runs co-axially with the long axis of the housing means and serves to collect permeate fluid from the membranes. A permeate outlet or outlets in fluid communication with the permeate compartment serve to remove the permeate fluid from the housing means.

The present invention provides an improvement in the type of separation module described above wherein a seal device is positioned in the permeate compartment at a point along the long axis of the module to segment said permeate compartment into an area where the permeate has a lower product concentration than the feed fluid, and an area where the permeate has a higher concentration than the feed. Additionally, at least two permeate outlets are provided such that each is positioned to separately recover permeate fluid from each area of the permeate compartment.

The membrane separation separation modules of the present invention provide for the recovery of fluid permeating the membrane elements which has a higher product concentration than the feed. This recovered permeate can be used for applications requiring fluids of lesser purity than the required product, or alternatively can be recycled to the feed fluid entering the module to increase the efficiency of the module. Additionally, in applications in which the permeate component is recovered as a useful product, the present module design may be used to recover two or more permeate streams having different concentrations of permeate gasses.

DETAILED DESCRIPTION OF THE INVENTION

The present invention is an improved cross-flow membrane separation module design for the separation of a feed fluid. The improvement resides in a seal device positioned in the permeate compartment of a typical cross-flow separation module to segment the permeate compartment into an area where the permeate has a lower product concentration than the feed fluid and an area where the permeate has a higher product concentration than the feed fluid. In instances in which the separation module has a permeate compartment which comprises the annulus between the outer disk wall and the inside of the housing, such as in a module employing one or more hollow fiber disk elements, the seal device is typically a seal ring segregating the permeate compartment. In embodiments wherein the permeate is collected in a permeate pipe located on the center axis of the module, such as in a module containing a spiral wound membrane element, the seal device may be a plug positioned within the permeate pipe. This module design allows for the recovery of permeate fluid having a higher concentration than the feed but a lower concentration than the non-permeate product. This recovered permeate stream can be used for applications requiring product of lesser purity, or alternatively may be recycled and mixed with the feed stream to the module to increase the efficiency of the system. Additionally, in applications in which the permeate component is recovered as a useful product, the present module design may be used to recover two or more permeate streams having different concentrations of permeate gasses.

In instances wherein the permeate fluid having a higher product concentration than the feed is recycled back to the feed, the outlet for removing this permeate fluid from the module may be positioned in an enclosure which also includes the feed compression suction to allow simultaneous compression of the incoming feed and recycle permeate stream.

Figure 1:
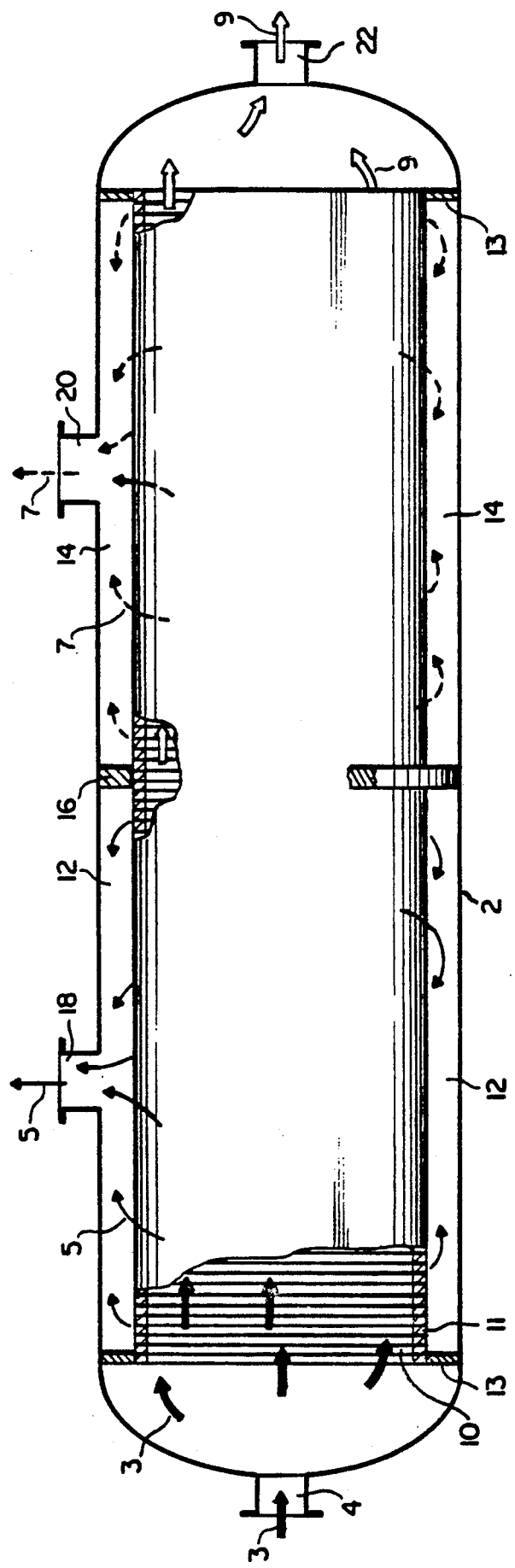
FIG. 1 is a longitudinal sectional view of a cross-flow membrane separation module of the present invention.

An embodiment of the present invention wherein hollow fiber membrane disk elements are positioned in a cylindrical pressure shell housing is depicted in the drawing of FIG. 1. A housing means 2, has a fluid inlet 4 positioned such that incoming feed fluid, represented by heavy arrows 3, travels axially through said housing means 2 and contacts a series of semi-permeable hollow fiber membrane disks 10 located within said housing means 2. The outsides of the ends of the hollow fiber membranes which make up the disks are encapsulated by a circumferential tubesheet 11 to form a hollow fiber disk element. The hollow fiber membrane disks 10 may be any material which is capable of separating one or more components of the feed stream, such as cellulose acetate, polysulfone, polyolefins, silicone rubber, poly(trimethylsilylpropyne) and the like. In other embodiments, the semi-permeable membrane elements may be in the form of a bundle of hollow fibers, spiral wrapped sheets or any other suitable configuration. The hollow fiber disk element is held in place within the housing means 2 by securing means 13 located along the circumference at each end of the disk element which also serve to form the end walls of the permeate compartment.

A product outlet 22 in fluid communication with the housing means 2 is provided for removing non-permeate product, represented by hollow arrows 9, from the housing means. The portion of feed fluid which permeates through the hollow fibers which make up the hollow fiber membrane disks 10 is collected as permeate fluid in a permeate compartment in fluid communication with the openings of the hollow fibers and which is segmented into an upstream section 12 and a downstream section 14 by a seal device 16. The seal device 16 is positioned in the permeate compartment at a point along the long axis of the module 2 such that permeate fluid, represented by thin arrows 5, entering the upstream segment 12 of the permeate compartment has a lower product concentration than the feed entering the module, and the permeate fluid, represented by dashed arrows 7, entering the downstream segment 14 has a higher product concentration than the feed. In a preferred embodiment, the seal device 16 is adjustable in that it can be moved within the permeate compartment to different locations depending upon the specific application and feed concentration. Since the pressure of the permeate fluid on both sides of the seal device 16 is virtually the same, and because some leakage across the seal device is permissible for most applications, the seal device 16 typically does not have to withstand high pressure or be fluid tight.

The permeate fluid from permeate sections 12 and 14 are collected separately via permeate outlets 18 and 20 respectively which are in fluid communication with the respective sections of the permeate compartment.

Figure 2:
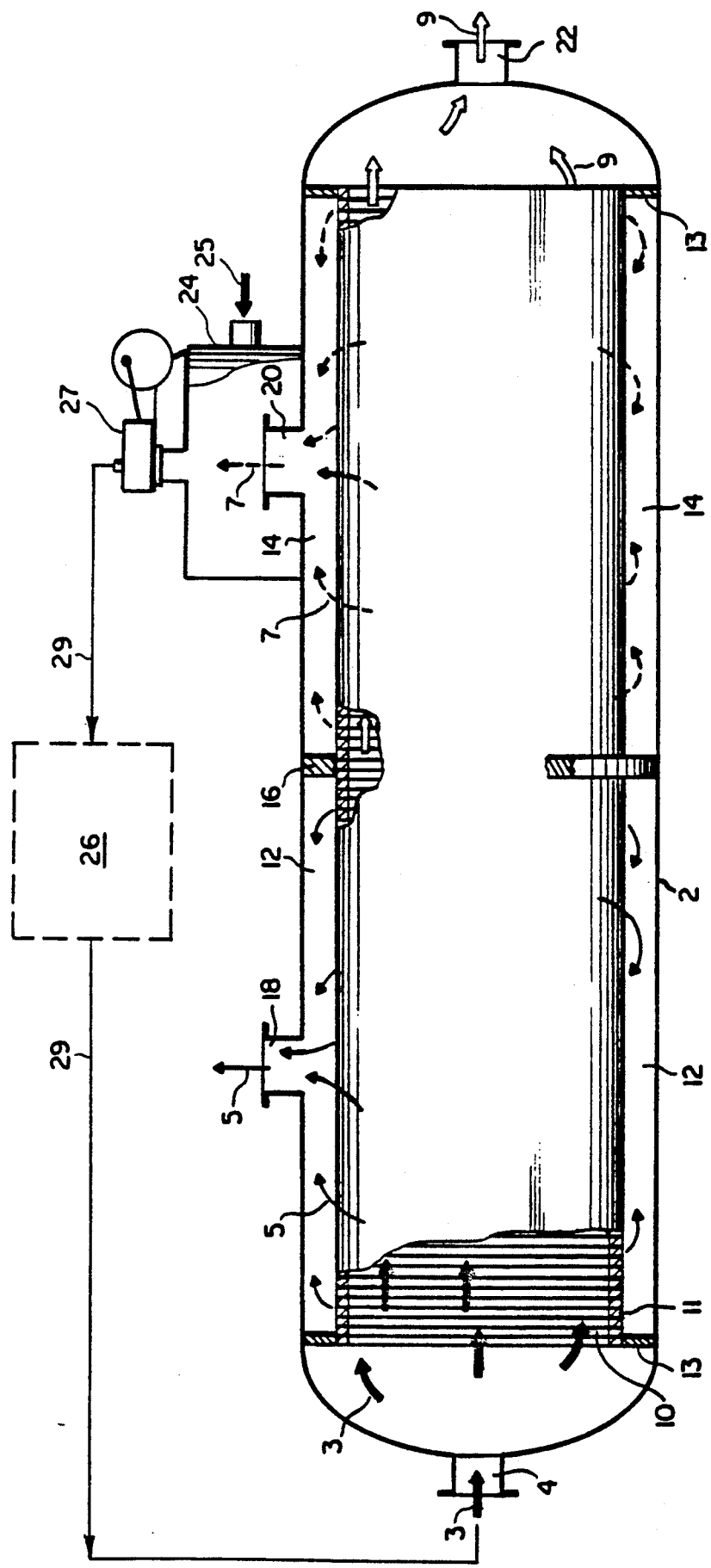
FIG. 2 is a longitudinal sectional view of an embodiment of a cross-flow membrane separation module of the present invention wherein an enclosure, including the feed compressor suction, is positioned around the section of the module wherein the permeate has a higher product concentration than the feed.

A second embodiment of the present invention is illustrated by the drawing of FIG. 2. All elements of the module in FIG. 2 which coincide with those of FIG. 1 are numbered the same. In the embodiment of FIG. 2, an enclosure 24 is positioned to include the permeate outlet 20 such that permeate fluid exiting the module through this fluid outlet 20 is mixed with incoming feed entering the enclosure 24 via inlet 25 and subsequently passed as a single recycle stream 29 to a feed compressor 27 prior to recycle back to the fluid inlet 4. A subsequent treatment unit 26 such as a cooling unit and/or oil or water removal unit may optionally be positioned downstream of the feed compressor 27 to treat the stream 29 being recycled to the fluid inlet 4.

The membrane separation modules of the present invention can be employed in a wide variety of separations, including liquid separations, gas separations and pervaporation applications.

EXAMPLE 1

Calculations were carried out to compare the performance of the module depicted in the drawing of FIG. 2 with the performance of a similar module without the seal device, and hence without any recycle under the same conditions of pressure, temperature, flow rate and feed composition. The module used in the calculations was a pressure shell configuration containing a plurality of polyolefinic hollow fiber disk elements. The calculations are for the production of nitrogen as the non-permeate product at purity levels of 98% and 99% from an air feed stream. Table 1 below sets out the membrane surface area reduction per unit of product produced along with the recovery increase realized by using the separation module of this invention.

TABLE 1

| | $N_2$ Purity | |
|---|---|---|
| | 98% | 99% |
| Membrane Surface Area Reduction | 9.5% | 14.5% |
| Recovery Increase | 9.7% | 17.2% |

From the results reported above, it can be seen that the present module design is more efficient in terms of product recovery and also requires significantly less membrane area than conventional membrane modules, especially for operations requiring high product purity.

Having thus described the present invention, what is now deemed appropriate for Letters Patent is set out in the following appended claims.

I claim:

1. In a cross-flow membrane separation module comprising:
   a) a housing means having a fluid inlet positioned such that incoming feed fluid contacts semi-permeable membranes contained by said housing means wherein said membranes separate the feed fluid into a non-permeate product stream and a permeate stream;
   b) a product outlet for collecting the non-permeate product stream;
   c) a permeate compartment running parallel to the long axis of the membrane module to collect permeate fluid from the membrane elements; and
   d) a permeate outlet in fluid communication with the permeate compartment for removing permeate fluid from said housing means, the improvement for increasing the efficiency of said separation module by recovering a portion of the permeate fluid which has a higher concentration of product than the feed fluid, said improvement comprising: a seal device positioned at a point along the long axis of the module to segment permeate flow into a stream with a lower product concentration than the feed fluid, and a stream with a higher product concentration than the feed; and said module having permeate outlets positioned to enable separate recovery of the permeate fluid from each area of the permeate compartment.

2. The separation module in accordance with claim 1 wherein said semi-permeable membranes comprise a bundle of hollow fibers.

3. The separation module in accordance with claim 1 wherein said semi-permeable membranes comprise one or more hollow fiber disks.

4. The separation module in accordance with claim 1 wherein said semi-permeable membranes are spiral wrapped membrane elements.

5. The separation module in accordance with claim 1 wherein the seal device may be moved to various locations within the permeate compartment.

6. The separation module in accordance with claim 1 wherein the permeate outlet positioned to remove the permeate stream which has a higher product concentration than the feed stream is in fluid communication with an enclosure in which said permeate stream is combined with a feed stream which enters said enclosure via a feed inlet in fluid communication with said enclosure wherein wherein said enclosure is in fluid communication with a compressor inlet such that the enclosure contains the compressor suction.

* * * * *